United States Patent
Remboski et al.

(10) Patent No.: US 8,180,516 B2
(45) Date of Patent: May 15, 2012

(54) DRIVER INFORMATION INTERFACE AND METHOD OF MANAGING DRIVER INFORMATION

(75) Inventors: Donald Remboski, Dearborn, MI (US); Judith L. Gardner, Detroit, MI (US); Charles C. Broun, III, Scottsdale, AZ (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 1452 days.

(21) Appl. No.: 10/164,499

(22) Filed: Jun. 6, 2002

(65) Prior Publication Data

US 2004/0204157 A1 Oct. 14, 2004

(51) Int. Cl.
*G09G 5/00* (2006.01)
*G05D 1/00* (2006.01)
*G06F 19/00* (2006.01)

(52) U.S. Cl. ..................... 701/29.1; 701/36.1

(58) Field of Classification Search ............. 701/29, 701/36, 1, 29.1; 345/172, 156, 170; 340/426.35, 340/458
See application file for complete search history.

(56) References Cited

U.S. PATENT DOCUMENTS

| | | | | |
|---|---|---|---|---|
| 4,731,769 | A | * | 3/1988 | Schaefer et al. ............... 369/6 |
| 4,792,783 | A | * | 12/1988 | Burgess et al. ............. 307/10.1 |
| 6,028,537 | A | * | 2/2000 | Suman et al. ................ 340/988 |
| 6,253,131 | B1 | * | 6/2001 | Quigley et al. ................ 701/36 |
| 6,421,593 | B1 | * | 7/2002 | Kempen et al. ............... 701/48 |
| 6,424,337 | B1 | * | 7/2002 | Eriksson et al. ............. 345/163 |
| 6,434,450 | B1 | * | 8/2002 | Griffin et al. .................... 701/1 |
| 6,812,942 | B2 | * | 11/2004 | Ribak ........................... 701/211 |
| 2002/0002444 | A1 | | 1/2002 | Williams et al. | |
| 2006/0200285 | A1 | * | 9/2006 | Obradovich ................... 701/30 |

FOREIGN PATENT DOCUMENTS

| | | |
|---|---|---|
| DE | 19961871 A1 | 7/2001 |
| DE | 10050223 A1 | 4/2002 |
| EP | 1164465 A2 | 12/2001 |

* cited by examiner

*Primary Examiner* — Tan Q Nguyen

(57) ABSTRACT

An interface (10) allows a user to choose when incoming information is received. Thus, the user may choose to receive particular types of information according to a current need for the information and when appropriate attention may be given to the information. The interface (10) identifies for the user at least the type of information to be received and a criticality and/or time-sensitivity of that information. The interface (10) may include, for each of a first, second and third information sources (12-16) a respective button (18-22) and a respective visual indicator (24-28).

20 Claims, 2 Drawing Sheets

DRIVER INFORMATION INTERFACE AND METHOD OF MANAGING DRIVER INFORMATION

CROSS-REFERENCE TO RELATED APPLICATIONS

This patent is related to the following commonly assigned U.S. patent applications: "Method and Apparatus for Vehicle Operator Performance Assessment and Improvement," Ser. No. 09/977,173; "Method and Apparatus for Improving Vehicle Operator Performance," Ser. No. 09/976,989; "Context Aware Wireless Communication Device and Method," Ser. No. 09/976,974; "Method and Response Synthesis in a Driver Assistance System," Ser. No. 09/976,560; and "System and Method for Driver Performance Improvement," Ser. No. 09/976,565, the disclosures of which are hereby expressly incorporated herein by reference.

TECHNICAL FIELD

This patent relates to information management systems and more particularly in exemplary embodiments to an interface and a method for managing information communicated to an operator of a vehicle.

BACKGROUND

The proliferation of communication devices creates a cacophony of bells, whistles, vibrations and other audible and haptic alerts which signal the presence of incoming information. Such alerts may be irritating to the user and others, such as an untimely device alert in a theatre. These alerts may create distractions leading to a loss of concentration in safety-critical situations, such as during a critical driving task.

Each communication device, a user may have several separate devices or an integrated device facilitating a number of communication services, provides its own alert. Additionally, a vehicle receives information from various vehicle systems relating to its operation and may also receive information from other vehicle-related systems such as a navigation system, an entertainment system and the like. The alerts, communications, annunciations and indications of these systems and devices, in whatever form they may be, are activated based upon the state of the associated system and not in relationship to the activity of the user or the condition of any other device or system. For example, navigation systems present information to the user/driver in synchronization to the position of the vehicle, but not in relation to the driver's attention. The driver may be focused on a particular task and miss some or all of the information provided by the navigation system.

The afore-mentioned U.S. patent application "Method and Response Synthesis in a Driver Assistance System," Ser. No. 09/976,560 describes a system for managing information arriving to the vehicle operator based upon the existing operating conditions of the vehicle and the condition of the driver. For example, the system may inhibit or otherwise manage an incoming voice communication if at the time the incoming communication is received the vehicle operator is engaged in a safety-critical driving task.

Too often, information is received simultaneously with other information or while one is attending to a demanding task. Thus, there remains a need for an interface and method that manages receipt of information based upon the user's activity, conveniently informs the user of the presence of information and allows the user to act on the existence of the information.

DETAILED DESCRIPTION

An interface allows a user to choose when incoming information is received. Thus, the user may choose to receive particular types of information according to a current need for the information and when appropriate attention may be given to the information. This alleviates the potential for information arriving simultaneously with other information or while the user is engaged in an activity requiring particular attention. Thus, the possibility of some or all of the information being missed and/or confused is reduced. The interface identifies for the user at least the type of information to be received and a criticality and/or time-sensitivity of that information. Embodiments are described wherein the interface and method are used in connection with a vehicle and a vehicle operator. Additional embodiments are described in other contexts. Still other applications will be appreciated by those of skill in the art.

Figure 1:
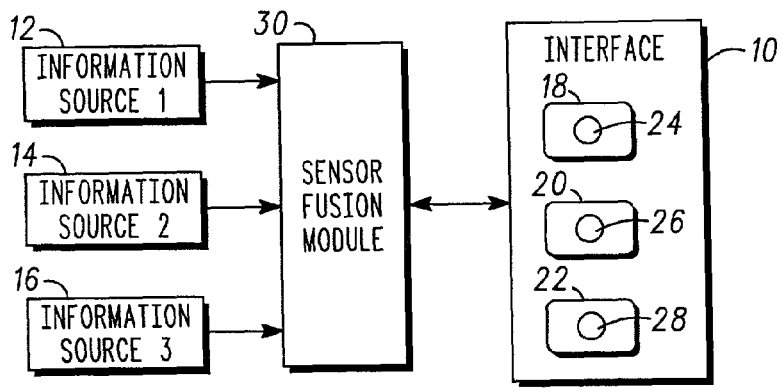
FIG. 1 is a block diagram illustrating an exemplary embodiment of a system incorporating an user interface.

FIG. 1 illustrates in block diagram form an interface 10 coupled to a receive information from a plurality of information sources, respectively indicated as first information source 12, second information source 14 and third information source 16. By way of example, and not limitation, the interface 10 may be disposed within a vehicle and the first information source 12 may be vehicle related information received from the various systems and controllers located within the vehicle, the second information source 14 may be voice and/or data information such as a voice call, an email message, a page message, a short text message, web content and other such information received via a wireless communication system such as a cellular communication system, and the third information source 16 may be navigation data received from a navigation system operating in conjunction with the operation of the vehicle.

The interface 10 includes, for each of the first, second and third information sources 12-16 a button, respectively buttons 18-22 and a visual indicator, respectively indicators 24-28. The interface 10 may have other forms, for example, the interface 10 may include a touch screen display and the buttons and indicators are appropriately indicated regions of the touch screen display. Each indicator 24-28 may have one of plurality of states, e.g., inactive, steadily indicated or flashed. Alternatively, the indicator may indicate one of a plurality of colors, e.g., green, red and yellow. Still further states may be derived and indicated by the indicators 24-28 by combining the animated states of the indicator, i.e., inactive, steadily indicated or flashed, with colors.

The interface 10 may be coupled directly to the sources of information, and therefore, the interface 10 may contain a processor, memory and control program for carrying out its operation described herein. Alternatively, as shown in FIG. 1, the interface 10 may be coupled to the sources of information 12-16 via a sensor fusion module 30. In yet a further alternative arrangement, the interface 10 may incorporate the functionality of a sensor fusion module. A sensor fusion module suitable for use in connection with the interface 10 is described in the afore-mentioned patent application "Method and Response Synthesis in a Driver Assistance System," Ser. No. 09/976,560.

The state of the indicator informs the user as to the availability of information relating to the associated system. In one embodiment, if the indicator is inactive (off) meaning there is no incoming information at the present time or previous incoming information is no longer relevant. If the indicator is in a steadily indicated state (on but not flashing), there is incoming information, but the incoming information does not require immediate attention. If the indicator is in a flashed state (flashing on and off), there is present real-time information to which a response is necessary. These states may be understood by considering the following illustrative examples.

First information source 12 may relate to the vehicle operation or condition. An inactive indicator in this instance indicates that there is no information relative to the vehicle's features or condition or the driver's present driving behavior available. A steadily lighted state indicates non-safety critical information about the vehicle or the driver's behavior is available. Such information may include, but is not limited to, needed vehicle service, available vehicle features, or hints to the driver about the consequences of current driver behavior. Such information is not time-sensitive or urgent. A flashed state indicates non-safety critical information about the vehicle, vehicle features, or driver's behavior, which is time-sensitive, is available. If, for example, a situation in the previous condition becomes more urgent, the indicator would change from a steady indicated state to a flashing state. If the information in the flashing mode becomes safety critical, it would be presented via a warning system rather than through this information system. Throughout the preceding description, the "non-safety critical" nature of the information being processed has been emphasized. This is based on the assumption that warnings of imminent danger should be presented as soon as possible by whatever means available to the driver in order to provide adequate reaction time to avoid the danger. In other words, there should be no delay while the system waits for the driver to recognize that there is a warning waiting and to activate it. Thus, the interface and method described herein is not a warning system but an information management system.

Second information source 14 may relate to voice, data, web content, or other wireless communication data. When this indicator is inactive it means that there is no incoming information or message, neither real-time nor in data storage (such as voice mail). There is information available, but no one is waiting for a response and the information (or message) is not time-sensitive. Alternatively, the steadily indicated state may be activated if a flashing indicator receives no response and the time-sensitivity is no longer operative (such as when a call is not answered and a voice mail message is left). The indicator flashes when a message is marked "urgent" by its sender, when the sender has been previously identified by the system user as a source of priority messages, or when the caller is on-line real-time awaiting a response. As noted, if a caller leaves a voice mail (that is not marked urgent) the flashing indicator reverts to a steady, non-flashing indication.

Whether information is response-necessary or time-sensitive is subjective and may differ by user. For example, the received information may indicate that there is an incoming phone call and that the calling party is waiting for a response. Or, as suggested above, certain callers may be given priority, and hence incoming messages from those callers result in a flashing indication. Preferences may be retained within a memory (not depicted) within the interface 10, or may be loaded into the interface 10 during usage of the vehicle or device to which it is associated. A system and method for transporting personal preferences is described in the afore-mentioned US patent application "Context Aware Wireless Communication Device and Method," Ser. No. 09/976,974.

Third information source 16 may relate to a navigation or real-time traffic information system. An inactive indicator here indicates either that there is no destination entered into the route guidance system or that there is no upcoming navigation maneuver in some number of minutes (either determined by the system or set by user preference) minutes or kilometers. Alternately, when a flashing indication is ignored for a period of time and no further alternatives are available, the indicator will be deactivated, since it would only be a nuisance to a driver who may be stuck in a traffic jam. When the indicator is steadily indicated there is an upcoming navigation maneuver within a range of minutes or kilometers for which the vehicle is in correct lane position and is within appropriate operating parameters. Or there is real-time traffic information about the driver's chosen route that may require a discretionary change of route. When the indicator is flashing, quick response within some minutes or kilometers is needed from the driver or the safe execution of the maneuver is in doubt. If the flashing indicator is ignored and the maneuver is missed, the flashing light will be extinguished until the route guidance system has recalculated the route and is ready to present the new instructions. Alternately, a flashing indicator might mean that the vehicle is rapidly enough approaching blocked traffic that alternate routes are quickly being eliminated.

To access the available information, as indicated by the state of the indicator, the user presses the associated button. The interface 10 enables the associated information source to provide the requested information in the manner in which the information source would otherwise have provided the information. For example, a voice alert may be given of an upcoming navigation maneuver, a voice call may be communicated via a hands free phone system, or an message indicator may illuminate indicating the status of a vehicle system.

Once the message has been received, the user may want to instruct the system regarding that message and/or information. For example, the user may wish to retain the information as fresh, save the information, respond to the information or delete it. The user may additionally wish to move on to a next message from the currently active information source or form another information source. The user may manipulate the information using the controls of the information source, or the interface 10 may be configured to accept voice input. The voice input may be activated automatically upon pressing the button for receiving the information.

Because operating a vehicle is a dynamic activity, conditions may change suddenly as the operator is receiving information from one of the information sources. The afore-mentioned U.S. patent application "Method and Response Synthesis in a Driver Assistance System," Ser. No. 09/976, 560 describes a process for suspending or terminating information delivery should the operator's cognitive load exceed a threshold. Interface 10 may be adapted to operate in accordance with the system or method therein described and/or the interface 10 may be adapted to operate in conjunction with such a system or method.

Since a vehicle is often shared by multiple drivers, it may be necessary for the interface 10 to recognize the current operator. As mentioned, U.S. patent application "Context Aware Wireless Communication Device and Method," Ser. No. 09/976,974 describes a system for identifying an operator as well for retrieving preferences for the current operator. Included in such a system, and in connection with the operation of the interface 10, the user may be prompted to provide a password. The password may be a coded sequence of presses of the buttons 18-22, a voice command and/or a combination of such techniques for accepting password data from the operator.

Figure 2:
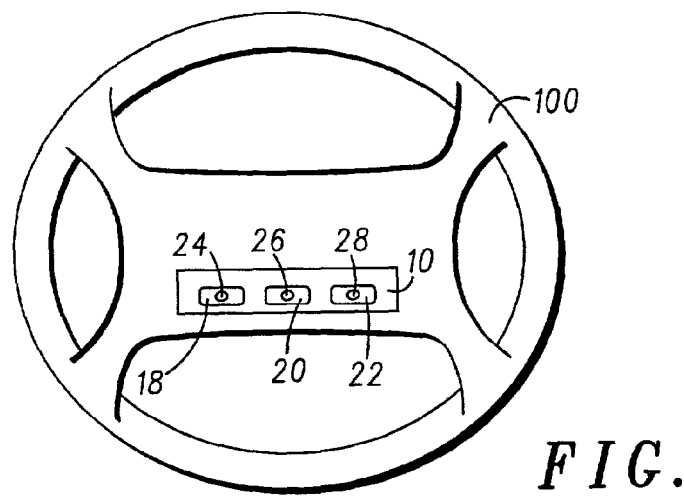
FIG. 2 is a graphic illustration of an exemplary embodiment of an interface.
Figure 3:
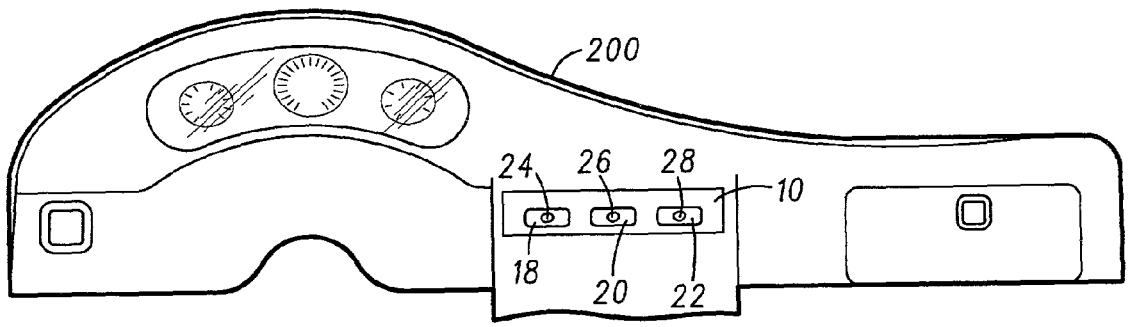
FIG. 3 is a graphic illustration of an alternate exemplary embodiment of an interface.

FIG. 2 illustrates graphically a steering wheel 100 of a vehicle (not depicted) including an interface 10. In such an arrangement, the interface 10 is conveniently located within the operator's sight and reach. FIG. 3 illustrates an instrument panel 110 of a vehicle (not depicted) including the interface 10. Again, the interface 10 is conveniently located relative to the operator's sight and reach. In yet another alternative arrangement, the indicators may be depicted within a heads-up display projected on the vehicle windshield. The buttons 18-22, which may still include indicators 24-28, may be located on the steering wheel 100, the instrument panel 110 or at another location convenient to the operator.

Figure 4:
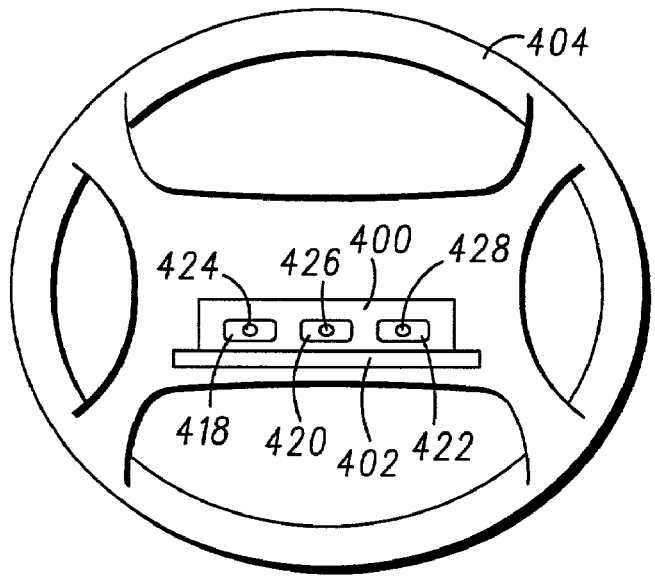
FIG. 4 is a graphic illustration of an alternate exemplary embodiment of an interface.

FIG. 4 illustrates an interface 400 that may be adapted to a vehicle. The interface 400 includes, for each of first, second and third information sources a button, respectively buttons 418-422 and a visual indicator, respectively indicators 424-428. The interface 400 is adapted to engage a docking station 402 secured to a steering wheel 404 of the vehicle and coupled to one or more information sources within the vehicle. Of course the docking station 402 could be secured at other locations within the vehicle. The interface 400 may therefore be configured with a particular operator's preferences, which may not only govern operation of the interface 400 itself, but also its interaction with the information sources.

Further to the embodiment shown in FIG. 4, the interface 400 may be configured as part of a cellular telephone, a pager, a personal digital assistant or other portable device. In that regard, the interface 400 may be adapted to operate in conjunction with vehicle systems when engaged with docking station 402 within the vehicle, and may remain operable in a standalone mode when undocked. The buttons and indicators may be configurable based upon the docked or undocked state of the device. For example, when docked, the button 418 and indicator 424 may be associated with vehicle operation information, whereas when undocked, the button 418 and indicator 426 may be automatically reconfigured to accept input from another information source. Button 420 and indicator 426 may still be associated with incoming voice, data or other content and button 422 and indicator 428 may be associated with a personal navigation system apart from the vehicle. Thus, it will be appreciated that the interface 400 is not limited to in-vehicle operation, but remains functional in either a docked or undocked state.

Figure 5:
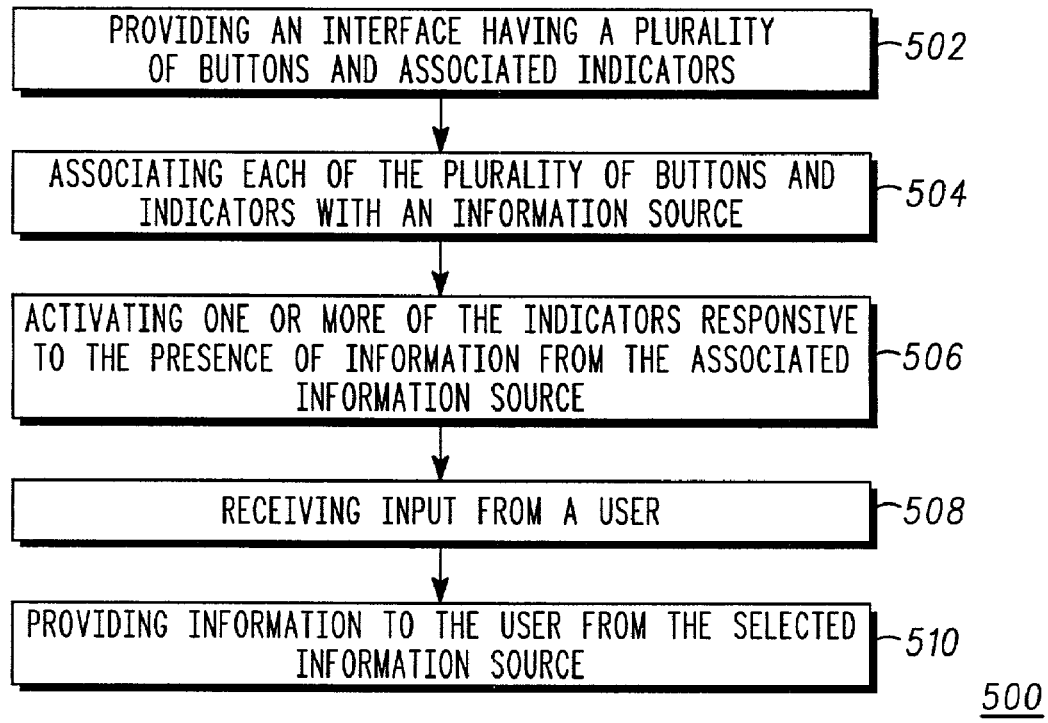
FIG. 5 is a flowchart depicting a method according to an exemplary embodiment.

FIG. 5 illustrates a method 500 of managing information. The method 500 begins at step 502 by providing an interface having a plurality of buttons and associated indicators. At step 504, each of the plurality of buttons and associated indicators are associated with an information source. The indicators are activated in one of a plurality of possible states based upon the presence of information received from the associated information source at step 506. Input is received from the user pressing one of the buttons at step 508, and at step 510, the information associated with the button and indicator is provided to the user.

This application described several specific embodiments. However, one of ordinary skill in the art will appreciate that various modifications and changes can be made to these embodiments. Accordingly, the specification and drawings are to be regarded in an illustrative rather than restrictive sense, and all such modifications are intended to be included within the scope of the present patent.

We claim:

1. An interface for managing information comprising:
   a plurality of buttons, each button having an information indicator associated therewith, each button and its associated information indicator defining a plurality of button and information indicator pairs, and each button and information indicator pair being associated with a corresponding information source of a plurality of different information sources, wherein the plurality of information sources comprises at least one source of information from the group comprising: navigation information and real-time traffic information;
   each information indicator having at least three visible indicator states, wherein each visible indicator state of the information indicator is indicative of an availability of information from the associated source of information, a first visible indicator state being an indicator off state, a second visible indicator state being an indicator steady on state and, a third visible indicator state being a flashing state during which an indicator flashes on and off; and
   wherein the information indicator flashing state indicates that there is present at the corresponding information source, real-time information to which a response is necessary;
   wherein each button is operable to cause a dissemination of the information from the associated source of information.

2. The interface of claim 1, further comprising a touch-screen display and wherein each indicator comprises a corresponding region of the touch screen display.

3. The interface of claim 2, wherein a region of the touch screen display corresponding to an indicator, is configured to be able to indicate a plurality of colors.

4. The interface of claim 2 wherein each indicator pair of the plurality of buttons and indicators pairs is one corresponding region of the touch screen display.

5. The interface of claim 1, further comprising a touch-screen display and wherein the plurality of buttons is comprised of a plurality of touch-sensitive regions of the touch-screen display.

6. The interface of claim 1, wherein the interface is disposed within a vehicle, and wherein at least one source of information is directly connected to the interface.

7. The interface of claim 1, wherein the steady on state indicates non-safety critical vehicle information.

8. The interface of claim 1, wherein the interface is configured to provide access to available information that is indicated by a visible indicator state, the access being provided responsive to actuation of the button associated with the indicator having the visible indicator state.

9. Within a vehicle having a plurality of information sources, the information from each source to be communicated to an operator of the vehicle, an interface for managing communication of information from each source of the plurality of sources to the operator of the vehicle, the interface comprising:

a plurality of buttons, each button having an information indicator associated therewith forming a button and information indicator pair, and each button and information indicator pair being associated with one of the plurality of sources of information, wherein the plurality of information sources comprises at least one source of information from the group comprising:

navigation information and real-time traffic information;

each status indicator having a plurality of visible indicator states, wherein at least one indicator state being indicative of information from the source of information and indicative of whether the information from the source has a time-sensitive or urgent characteristic;

each button is operable to cause a dissemination of information from the associated source of information, the dissemination caused by operation of a button being in a manner in which the information would have otherwise been disseminated; and the plurality of buttons being located within the vehicle in close proximity to each other wherein a first state of a visible indicator is an off state, thereby indicating that no information is available from the corresponding information source, a second state of a visible indicator is a steady on state, indicating availability of non-safety critical information, and a third state is a flashing state during which an indicator flashes on and off, the flashing state indicating the presence of non-safety critical but time-sensitive information to which a response is necessary.

10. The interface of claim 9, wherein the interface is located within the steering wheel of the vehicle.

11. The interface of claim 10, wherein the interface is comprised of a touch screen display and wherein each indicator and each button associated with each indicator comprises a region of the touch screen display.

12. The interface of claim 11, wherein regions of the touch screen display corresponding to an indicator, are configured to be able to indicate a plurality of colors.

13. The interface of claim 9, wherein the interface is located on an instrument panel within the vehicle.

14. The interface of claim 13, wherein the interface is comprised of a touch screen display and wherein each indicator and each button associated with each indicator comprises a region of the touch screen display.

15. The interface of claim 14, wherein regions of the touch screen display corresponding to an indicator, are configured to be able to indicate a plurality of colors.

16. A method of managing information comprising:

providing an interface having a plurality of, buttons and information indicator, pairs;

associating each indicator pair with an information source;

responsive to the presence of information from a source of information and a time-sensitive or urgent characteristic of said information, activating the indicator of the associated, button and information indicator pair, in one of a plurality of possible visible indicator states, a first state being an indicator off state, a second state being an indicator steady on state, which indicates there is present at the corresponding information source, non-safety critical incoming information but which does not require immediate attention, and a third state being an indicator flashing state during which the indicator flashes on and off, the flashing state indicating that there is present at the corresponding information source that is non-safety critical information but which is time-sensitive;

detecting the selection of one of the buttons and information indicator pairs by a user; and providing to the user the information from the source of information associated with the selected one of the buttons and information indicator pairs.

17. The method of claim 16, wherein the step of providing an interface includes the step of providing an interface comprising a touch-screen display and wherein each indicator pair comprises a corresponding region of the touch screen display in which buttons and indicators are appropriately indicated.

18. The method of claim 17, wherein the step of providing an interface comprising a touch-screen display includes providing a touch screen display that is capable of displaying a plurality of colors.

19. The method of claim 17, wherein the step of providing an interface comprising providing an interface within a vehicle and connecting the interface directly to an information source.

20. The method of claim 16, wherein the step of providing an interface comprises arranging the buttons and information indicator pairs in proximity of one another.

* * * * *